(12) United States Patent
Hurwitz et al.

(10) Patent No.: US 11,036,780 B2
(45) Date of Patent: Jun. 15, 2021

(54) AUTOMATIC LOT CLASSIFICATION

(71) Applicant: eBay Inc., San Jose, CA (US)

(72) Inventors: Daniel Lee Hurwitz, Petah Tikva (IL); Ido Guy, Haifa (IL)

(73) Assignee: eBay Inc., San Jose, CA (US)

( * ) Notice: Subject to any disclaimer, the term of this patent is extended or adjusted under 35 U.S.C. 154(b) by 210 days.

(21) Appl. No.: 15/916,207

(22) Filed: Mar. 8, 2018

(65) Prior Publication Data

US 2019/0278865 A1 Sep. 12, 2019

(51) Int. Cl.
*G06F 16/00* (2019.01)
*G06F 16/35* (2019.01)
*G06N 20/00* (2019.01)

(52) U.S. Cl.
CPC ........... *G06F 16/358* (2019.01); *G06F 16/35* (2019.01); *G06N 20/00* (2019.01)

(58) Field of Classification Search
CPC ........ G06F 16/358; G06F 16/35; G06N 20/00
USPC ......................................................... 707/737
See application file for complete search history.

(56) References Cited

U.S. PATENT DOCUMENTS

| | | | |
|---|---|---|---|
| 6,751,600 B1 | 6/2004 | Wolin | |
| 7,827,125 B1* | 11/2010 | Rennison | G06F 16/319 706/14 |
| 7,870,039 B1 | 1/2011 | Dom et al. | |
| 7,962,374 B2 | 6/2011 | Altschuler | |
| 8,036,945 B2 | 10/2011 | Speers et al. | |
| 8,463,810 B1* | 6/2013 | Rennison | G06F 16/319 |
| 8,631,005 B2 | 1/2014 | Sarwar et al. | |
| 8,799,114 B2 | 8/2014 | Grove et al. | |
| 9,111,289 B2 | 8/2015 | Liu et al. | |
| 9,501,551 B1 | 11/2016 | Weissgerber et al. | |
| 2010/0114855 A1 | 5/2010 | Li et al. | |
| 2012/0259844 A1* | 10/2012 | Yuan | G06F 16/9535 707/723 |
| 2015/0052143 A1* | 2/2015 | Liu | G06Q 30/00 707/740 |

(Continued)

FOREIGN PATENT DOCUMENTS

WO 2019173032 A1 9/2019

OTHER PUBLICATIONS

Subhro Roy et al., "Reasoning about Quantities in Natural Language", Association for Computational Linguistics on Jan. 2015, 14 pages.*

(Continued)

*Primary Examiner* — Monica M Pyo
(74) *Attorney, Agent, or Firm* — Holland & Hart LLP (57) ABSTRACT

Methods, systems, and media for lot classification are disclosed. In one example, a classification system for identifying lot listings receives a description for a listing in a publication system, identifies a string in the listing, identifies a quantity word or digit in the string, and converts an identified quantity word into digit form. A normalized string is tokenized to produce tokens, the tokenizing of the normalized string including splitting the normalized string into a series of substrings using a sequence of delimiters. For each substring, an additional split is performed by separating any digit from any other adjacent character, unless that character is another digit, and maintaining an internal character order of each split substring to produce a flattened list of tokenized tokens.

18 Claims, 9 Drawing Sheets

(56) References Cited

U.S. PATENT DOCUMENTS

2017/0068667 A1* 3/2017 Sundaresan ......... G06F 17/2785

OTHER PUBLICATIONS

International Search Report received for PCT Application No. PCT/US2019/017922, dated Apr. 18, 2019, 3 pages.
Written Opinion received for PCT Application No. PCT/US2019/017922, dated Apr. 18, 2019, 6 pages.
International Preliminary Report on Patentability received for PCT Application No. PCT/US2019/017922, dated Sep. 17, 2020, 8 pages.

* cited by examiner

| FEATURE VECTOR | INPUT(S) | OUTPUT(S) |
|---|---|---|
| TOKEN AFTER | TOKENIZED LISTING TITLE, POSITION OF NUMERICAL TOKEN IN TOKENIZED TITLE P | TOKEN AT POSITION P+1 |
| BIGRAM AFTER | TOKENIZED LISTING TITLE, POSITION OF NUMERICAL TOKEN IN TOKENIZED TITLE P | TOKENS AT POSITIONS P+1 AND P+2 |
| TOKEN BEFORE | TOKENIZED LISTING TITLE, POSITION OF NUMERICAL TOKEN IN TOKENIZED TITLE P | TOKEN AT POSITION P−1 |
| BIGRAM BEFORE | TOKENIZED LISTING TITLE, POSITION OF NUMERICAL TOKEN IN TOKENIZED TITLE P | TOKENS AT POSITIONS P−1 AND P−2 |
| UNIT OF MEASURE APPEARS AFTER [THIS METHOD REFERENCES A PRE-DEFINED LIST OF UNIT-OF-MEASURE (UOM) TOKENS (E.G., METERS, KM, LITERS).] | TOKENIZED LISTING TITLE, POSITION OF NUMERICAL TOKEN IN TOKENIZED TITLE P | TRUE IF A UOM TOKEN APPEARS IN POSITION P+1, ELSE FALSE. |
| TOKEN POSITION RATIO | TOKENIZED LISTING TITLE, POSITION OF NUMERICAL TOKEN IN TOKENIZED TITLE P | THE RATIO OF THE GIVEN TOKEN'S POSITION P TO THE LENGTH (IN TOKENS) OF THE TOKENIZED TITLE. P / (LENGTH(TITLE) − 1) |
| TOKEN IS DIVISIBLE BY K [THIS METHOD IS USED TO CREATE THREE SEPARATE FEATURE ELEMENTS BY USING THREE DIFFERENT K ARGUMENTS (E.G. 2, 5, 10).] | NUMERICAL TOKEN T IN TOKENIZED TITLE, POSITIVE NATURAL NUMBER K | TRUE IF T IS DIVISIBLE BY K, ELSE FALSE |

Fig. 6

| ITEM | LOT_SIZE = 4 |
|---|---|
| RAW ITEM TITLE | "Vier Stuck Apple iPhone 5s" |
| PREPROCESSED TOKENIZED TITLE | ["4", "stuck", "apple", "iPhone", "5", "s"] |
| TRAINING EXAMPLE #1 | Token="4", Label=POS |
| TRAINING EXAMPLE #2 | Token="5", Label=NEG |

AUTOMATIC LOT CLASSIFICATION

TECHNICAL FIELD

Embodiments of the present disclosure relate generally to data categorization. The disclosure is related more specifically to automatic lot classification.

BACKGROUND

It is becoming increasingly common for online users to search for particular information, such as a product or service, in which they are interested using electronic search mechanisms, such as Internet-based search engines. The complex systems used by such electronic search mechanisms to process incoming product data from multiple merchants, and deliver that product data in the form of search results to millions of customers, seek to ensure that customers receive the best information available. In order to do this, the initial underlying data must first be obtained and will typically include information pertaining to millions of product or service offerings obtained from multiple sources. The information is often haphazard in format and content, and may even be inconsistent in some areas. Once obtained, the rough information is therefore usually categorized in order to, among other things, facilitate comparison of data and allow a clean, searchable presentation of information.

While various and many attempts have been made to categorize products, very little attention has been given to classifying lots. One approach to categorizing product offerings has included a manual categorization approach. In the manual categorization approach, a human operator assigns product offerings to product categories. This manual method may in some circumstances be applicable for lot classification too. A problem with the manual categorization approach is that it is time and resource consuming, since a human operator typically seeks to assign each product offering to one or more particular product categories.

Even a machine-learning system that attempts to learn a set of rules from supervised training cases faces significant challenge. For example, supervised techniques may require a large number of tagged training cases. Another example of a technical challenge that may exist is that such training cases cannot be generalized across different types of products. As a result, machine training techniques also face challenges in terms of scalability.

The present inventors seek to address these and other technical problems, and seek to provide automatic lot classification systems, methods and media as technical solutions thereto, as described more fully below.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail. The present disclosure provides technical solutions for optimizing and improving lot classification. Systems, methods, and architectures for deployment optimization are disclosed herein.

"CARRIER SIGNAL", in this context, refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE", in this context, refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK", in this context, refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT", in this context, refers to a device, a physical entity, or logic having boundaries defined by function, method, property, object or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e,g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM", in this context, refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR", in this context, refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by any one of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2018, eBay Inc., All Rights Reserved.

A "lot" listing pertains to a group of identical items, such as batteries, as opposed to a "combination" or "bundle" listing, such as a camera and camera bag, for example. One conventional approach might be to classify a listing as a "lot" or "not-lot" based on various features using a machine learning classifier. Here, in one aspect, the problem is simplified and reduced to a classification of quantity words in a listing's title. In other words, a title without any quantity words is classified as "not lot". A listing having a title including one or more quantity words may prima facie pertain to a lot and be classified on that basis accordingly. This may introduce significant errors since even a bundle listing may include more than one particular item in it. The title in the present disclosure is processed in accordance with the methods described herein and will be classified as a "lot" if at least one of the quantity words is predicted or assessed to pertain in fact to a lot; otherwise the listing will be classified as "not lot".

In some examples, the present disclosure relates to a system, method, and computer media for automatic lot classification based on the prima facie presence of quantity words appearing in a listing title. A description for a listing is received in a publication system. Various system components identify a string in the listing, identify a quantity word or digit in the string, and convert an identified quantity word into digit form. The string is normalized and includes only lowercase characters or digits. Further, the normalized string is tokenized to produce tokens. The tokenizing of the normalized string includes splitting the normalized string into a series of substrings using a sequence of delimiters. Additional splitting of the substrings is performed. Further, the disclosure describes assigning a probability to at least one token as being indicative of a lot quantity and classifying the listing as a lot listing based on the assigned probability. Based on the classification, a component in the system causes the display of the listing as a lot listing.

Figure 1:
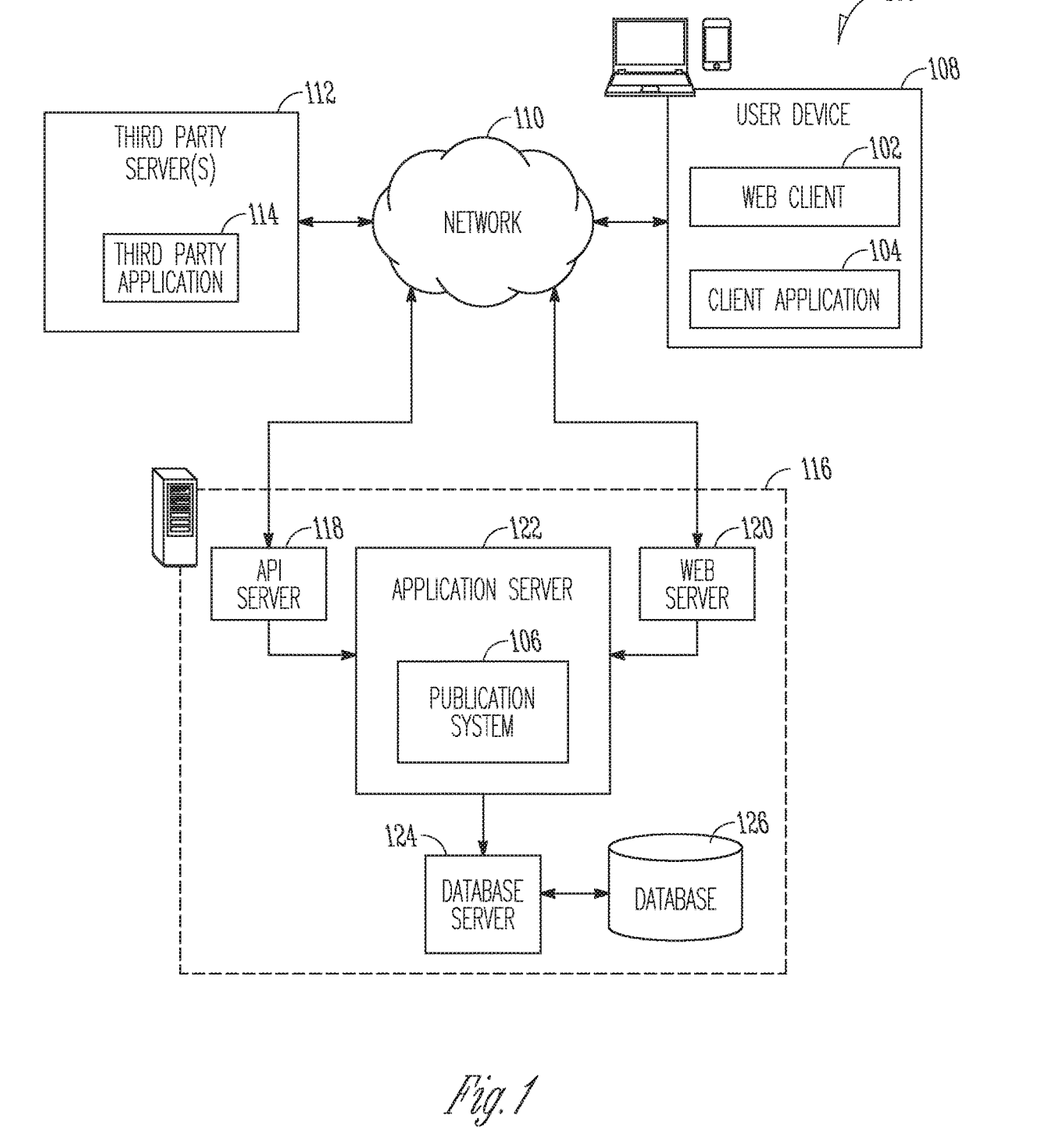
FIG. 1 is a block diagram illustrating a networked system, according to an example embodiment.

With reference now to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of an application 104, are hosted and execute on the client device 108. The networked system 116 includes an application server 122, which in turn hosts a publication system 106 that provides a number of functions and services to the application 104 that accesses the networked system 116. The application 104 also provides a number of interfaces described herein, which present output of tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An application program interface (API) server 118 and a web server 120 are coupled, and provide programmatic and web interfaces respectively, to the application server 122. The application server 122 is, in turn, shown to be coupled to a database server 124 that facilitates access to information storage repositories (e.g., a database 126). In an example embodiment, the database 126 includes storage devices that store information accessed and generated by the publication system 106. The database 126 may also store cloud-based or other data accessed or used by the application 104 executing on the client device 108, or a third-party application 114, executing on a third-party server(s) 112. The database 126 may be comprised of several remote or onsite databases, for example. Other configurations are possible.

The third-party application 114, executing on a third-party server(s) 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications 104 hosted by the client device 108, the web client 102 may access the various systems (e.g., publication system 106) via the web interface supported by the web server 120. Similarly, the application 104 (e.g., an "app") accesses the various services and functions provided by the publication system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present disclosure is not limited to such an architecture, and could equally well find application in a distributed, or peer-to-peer, architecture system, for example. The publication system 106 could also be implemented as a standalone software program, which does not necessarily have networking capabilities.

Figure 2:
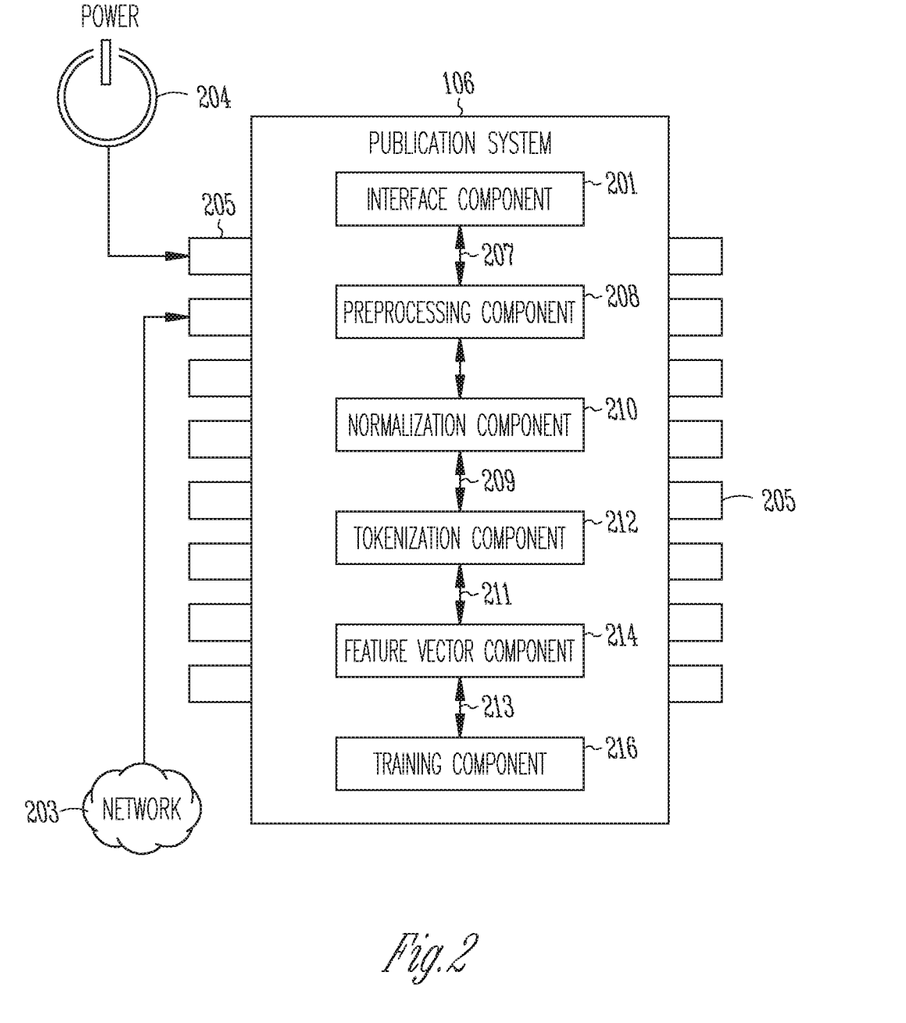
FIG. 2 is a block diagram showing architectural details of an example lot classification system, according to some example embodiments.

FIG. 2 is a block diagram showing architectural details of the publication system 106, according to some example embodiments. This is a non-abstract system in the view, a power button is shown at 204, and the publication system 106 includes computer processors and components, described further below. Hardwired connection pins may be seen at 205, for example. The publication system 106 is specially-configured and technically improved to implement the methods described herein.

More specifically, the publication system 106 is shown to include an interface component 201 by which the publication system 106 communicates (e.g., over a network 203) with other systems within the SaaS network architecture 100. The interface component 201 is collectively coupled to a lot classification component 206 that operates to perform, in conjunction with the illustrated components 208-216, automatic lot classification in accordance with the methods described further below with reference to the accompanying drawings. The components 208-216 include a preprocessing component 208, a normalization component 210, a tokenization component 212, a feature vector component 214, and a training component 216. The operations of these components are described further below.

Figure 3:
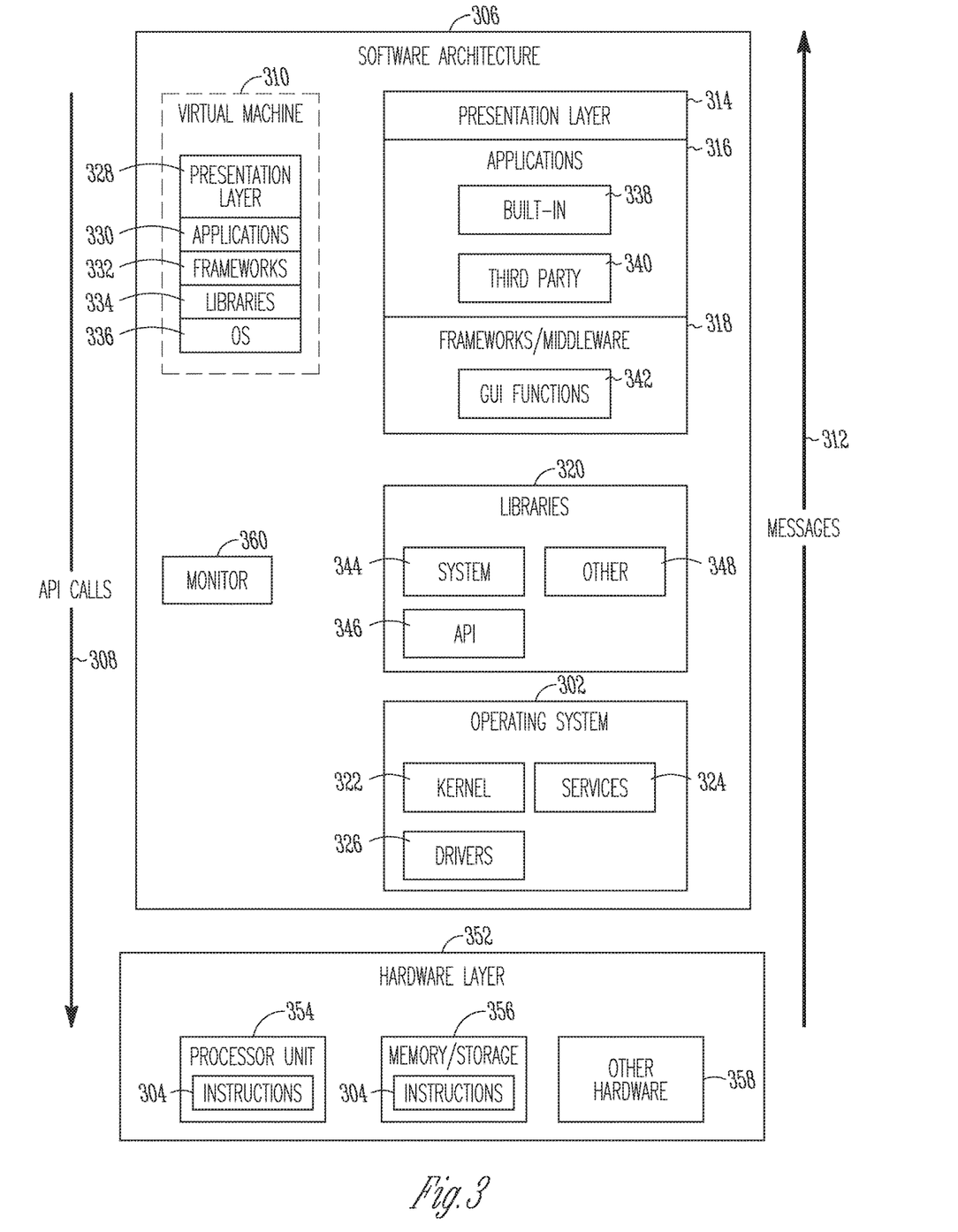
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein.

Figure 4:
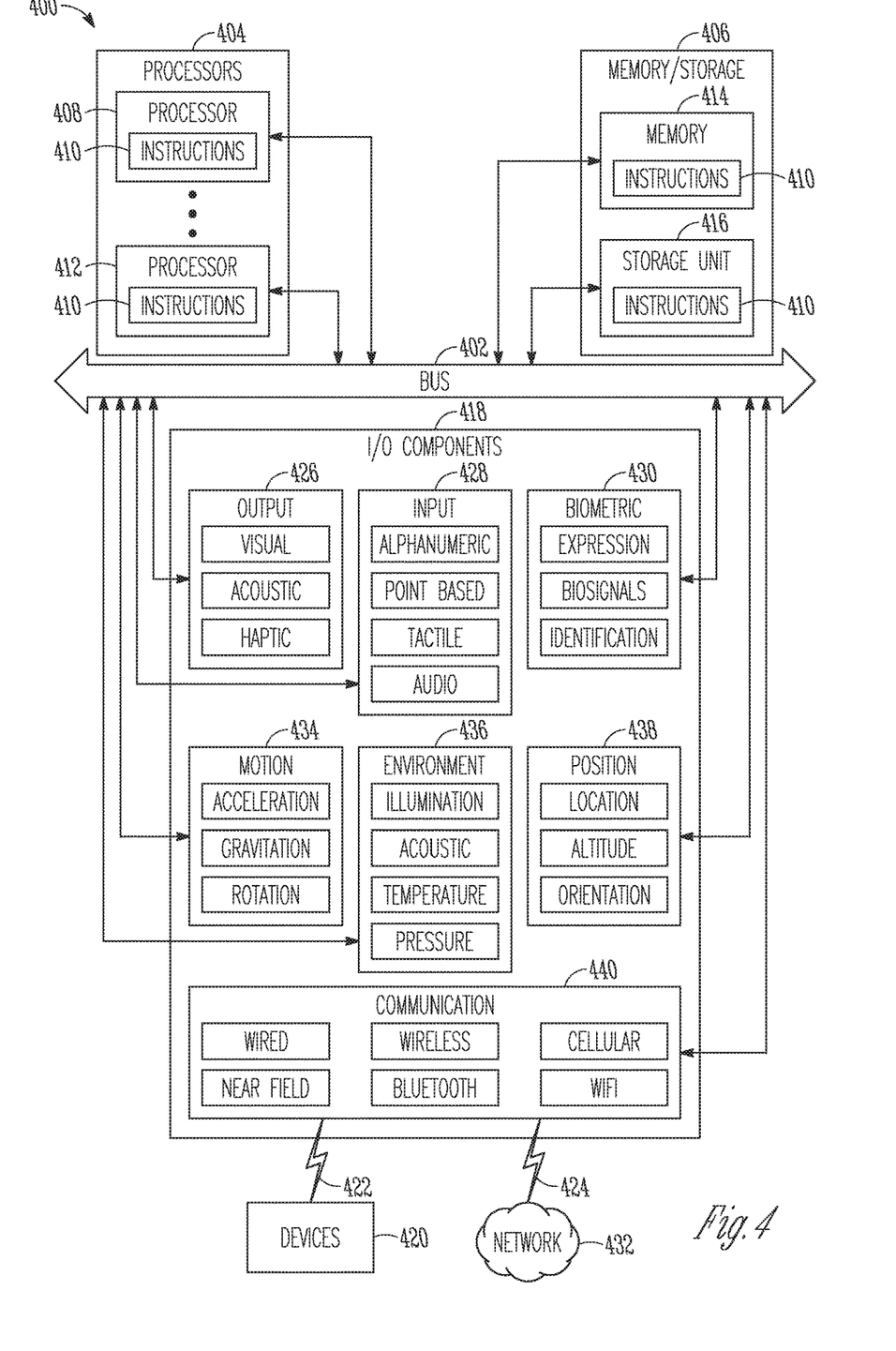
FIG. 4 is a block diagram illustrating components of a machine, according to some example embodiments, able to read instructions from a machine-readable medium (e.g., a machine-readable storage medium) and perform any one or more of the methodologies discussed herein.

The software architecture 306 may execute on hardware such as a machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions 304 of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke application programming interface (API) API calls 308 through the software stack and receive messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration, The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components or modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

FIG. 4 is a block diagram illustrating components of a machine 400, according to some example embodiments, able to read instructions 304 from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application 316, an applet, an app, or other executable code) for causing the machine 400 to perform any one or more of the methodologies discussed herein, may be executed. As such, the instructions 410 may be used to implement modules or components described herein. The instructions 410 transform the general, non-programmed machine into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine 400 will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422 respectively. For example, the communication components 440 may include a network interface component or another suitable device to interface with the network 432. In further examples, the communication components 440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

Referring back to FIG. 2, it will be recalled that in some examples the publication system 106 comprises inter alia components 208-216. Their respective operations are now described. The preprocessing component 208 receives as input 207 a raw item title in a given listing. The input item title is first normalized and then tokenized. The listing may be a lot listing, or it may not. The aim is to classify the listing accurately without classification errors of the type inherent in manual or conventional machine learning as discussed above, or at least minimize them. The preprocessing component 208 and the normalization component 210 act alone or in conjunction with each other to normalize the raw item title. The title is converted to lowercase and then any letter with an accent mark is replaced by its non-accented form. Tokens which are quantity (or number) words are converted to their numerical form. The output 209 from the normalization component 210 includes a normalized title string. An example normalization operation may include, as example input, "Vier Stuck Apple iPhone 5s", and as example output, "4 stuck apple iphone 5s".

Figure 5:
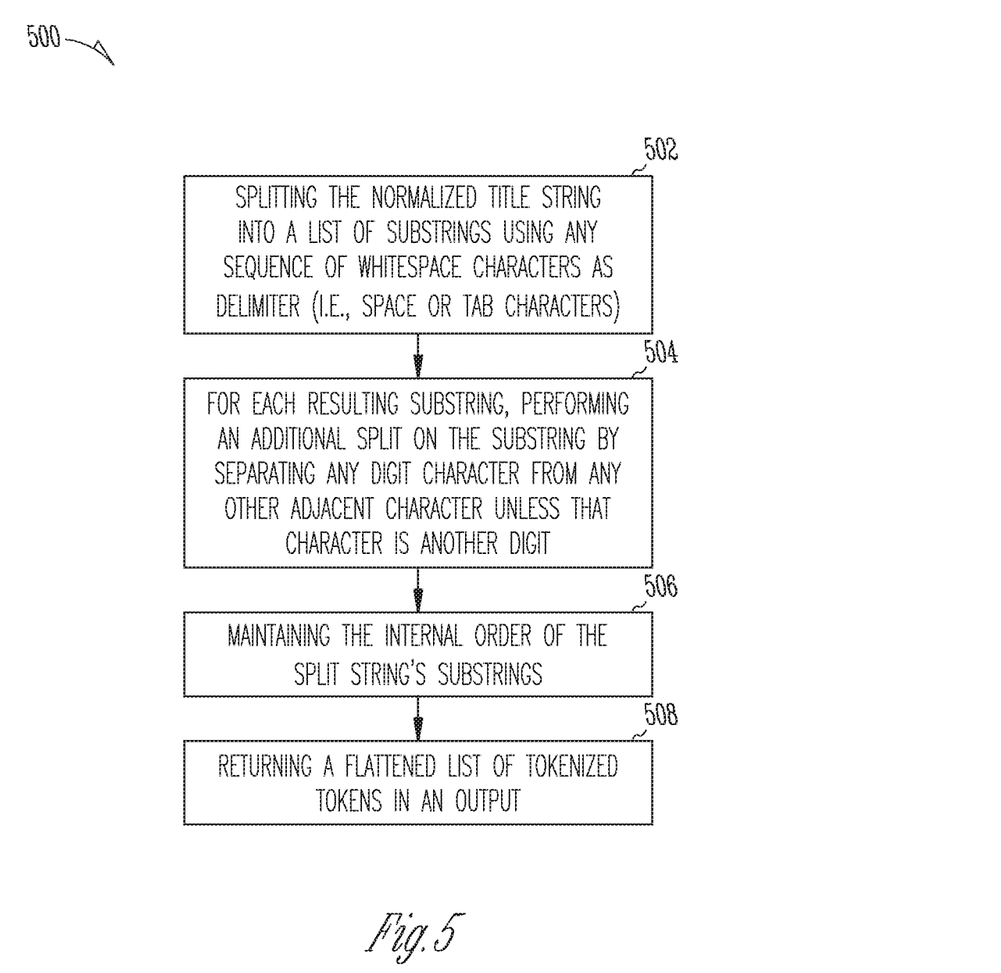
FIG. 5 is a flow chart of operations in a tokenization method, according to an example embodiment.

The normalized output 209 is received as input to the tokenization component 212 which operates to convert the input normalized title string into a list of tokenized strings ("tokens"). With reference to FIG. 5, an example tokenization method 500 may include one or more of the following operations: at operation 502, splitting the normalized title string into a list of substrings using any sequence of whitespace characters as delimiter (i.e., space or tab characters); at operation 504, for each resulting substring, performing an additional split on the substring by separating any digit character from any other adjacent character unless that character is another digit; at operation 506, maintaining the internal order of the split string's substrings; and, at operation 508, returning a flattened list of tokenized tokens in an output 211.

An example tokenization method may include: as example input 209 into the tokenization component 212 "4 stuck apple iphone 5s", and as example output 211 from the tokenization component 212 ["4", "stuck", "apple", "iphone", "5s"], or ["4", "stuck", "apple", "iphone", ["5", "s"]], or ["4", "stuck", "apple", "iphone", "5", "s"].

With reference now to the feature vector component 214, this component may work in conjunction with the other components 206-212 and 216, or independently therefrom to assist in computing one or more feature vectors as output 213. In order to train a model with a labeled example of a lot listing or to classify a new lot listing example with the trained model, a numerical vector is computed for that example. This vector serves as the actual input to the model itself and each of its elements represents a distinct feature which is computed using a specific method. In some examples, a vector includes features representing each quantity word that may distinguish between a lot word and a non-lot word. For example, a "token after" is a word after the quantity word and it may serve to distinguish between the two classes (e.g., if it is "package" the quantity word may more likely be a lot).

In some examples, a feature vector (whether it be for training or inference) is computed for each candidate quantity word. Meaning, a model is not computed on quantity words only because it is not known that words are quantities in advance—not all numerical tokens represent quantities. Each numerical token has the potential to become a listing's so-called "quantity word" (lot size). Therefore each feature (e.g., "token after") and its value (e.g., "package") aims to describe and contextualize a numerical token (e.g., "package" is the token after "10"), thus providing information for the model to estimate that candidate's likelihood of being a quantity word.

Figure 6:
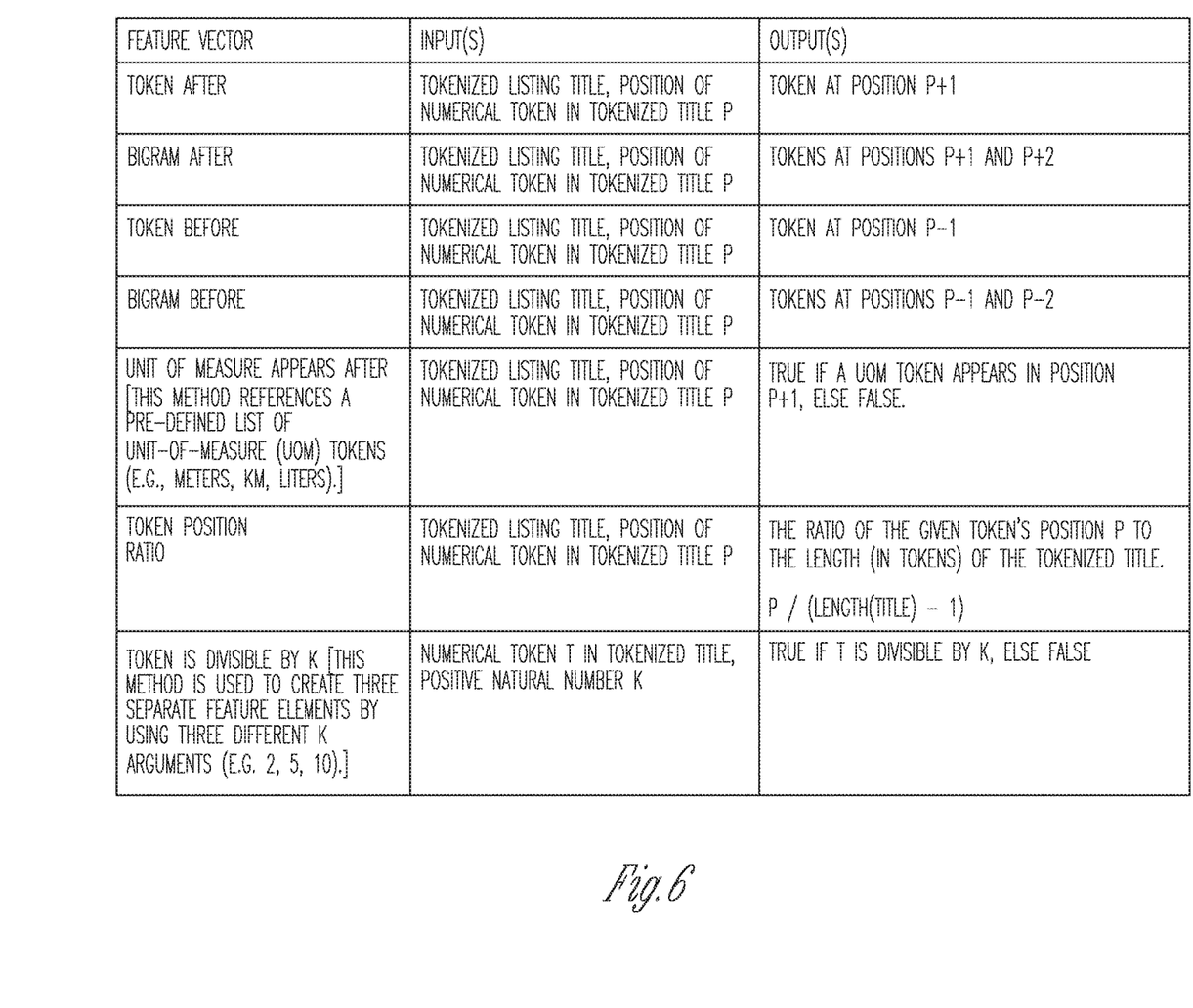
FIG. 6 is table showing aspects of feature vectors, according to example embodiments.

Example feature methods are set forth in the table illustrated in FIG. 6, The table includes an input and output for each feature method, and includes explanatory comments for some of the feature elements.

The training component 216 receives as input the computed feature vector output 213 by the feature vector component 214. In some examples, a model per meta category is trained by using a training set of listing titles for items which are listed under that category. These items may be historical or live items.

Training items are collected by filtering those which have a value in a field LOT_SIZE which is greater than 1. In some examples, this is a field that is optionally indicated by a seller of the item at a time of listing. If a LOT_SIZE value is not indicated by the seller, it has a default value of 1 and therefore such items are ignored and excluded from the training set. In order to train the model, only the raw title string and the LOT_SIZE value are extracted from the listing title and constitute an entry in the training set.

Labels are assigned to the training examples comprising the training set before training a supervised machine learning model. In one general example addressing the lot classification problem, positive labels indicate that an item (i.e., the listing title) pertains to a "lot" item while negative labels indicate it is not a "lot". More specifically in one implementation, numerical tokens in the item listing title are assigned labels testifying to whether or not the token indicates a lot size or a quantity of that item described by the title.

Figure 7:
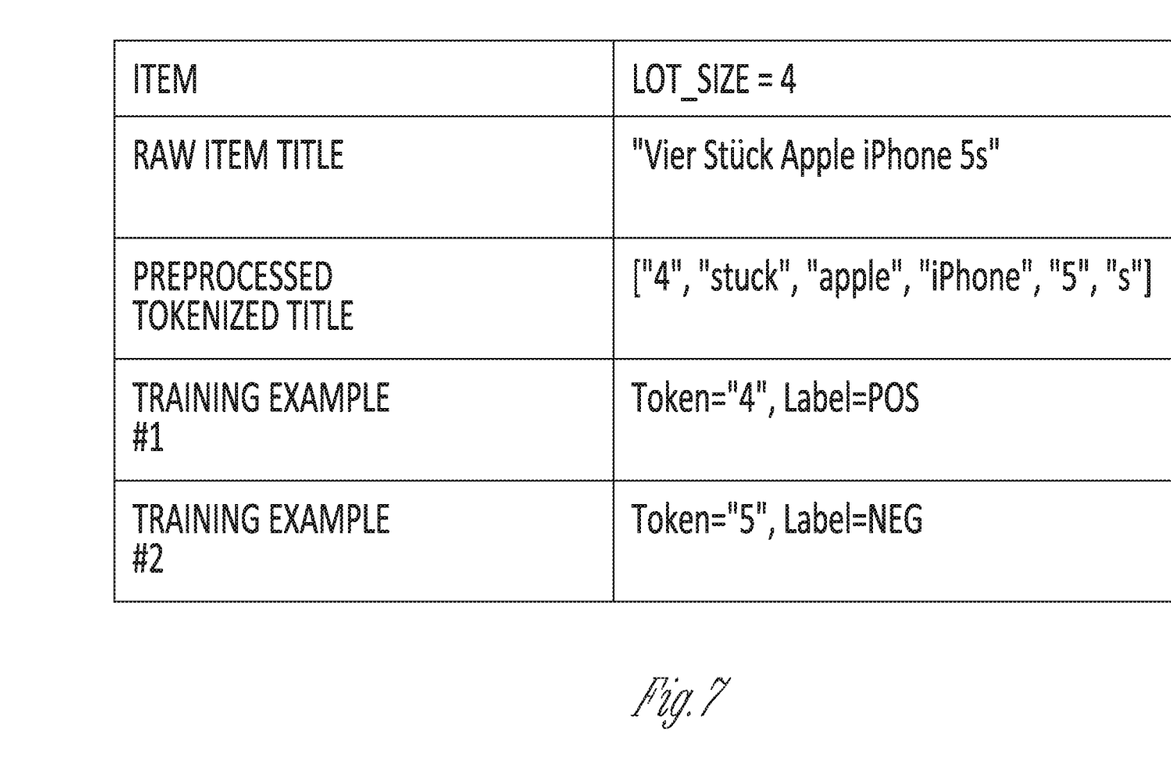
FIG. 7 is a table showing aspects of training examples, according to various embodiments.

Once the training set of item listing titles (also termed "training examples") and corresponding LOT_SIZE values have been assembled, the process of labeling the training data begins. Instead of labeling an item listing title, labels are given to only the numerical (positive natural number) tokens in a given item listing title. Thus, in one embodiment, the preprocessing step described above is executed on raw training item titles. As a result, numerical tokens which surface serve as the actual training examples fed to the model training process. Multiple training examples can sprout from the same item. A single training example (numerical token) can either have a positive or negative label in some examples. A positive label ("POS") may be assigned to a training example if the item from which it came had a LOT_SIZE value equal to the token represented by that example. Otherwise, a negative label ("NEG") is assigned to the example. Aspects of an example embodiment of a training example are shown in FIG. 7.

In some examples, the training model includes a Logistic Regression binary classifier. The model learns what characteristics (features) of "quantity" numerical tokens contribute to whether or not an item listing title (from which the token came from) can be classified as a "lot" listing using the label as the identifier. This learning method learns a weight for each of the features, which serve as the basis of the calculation of the answers (or predictions) calculated and output by the trained model.

Thus, in one example, a classification system comprises at least one processor and a memory storing instructions that, when executed by the at least one processor, cause the classification system to perform operations comprising, at least: receiving a description for a listing in a publication system; identifying a string in the listing, identifying a quantity word or digit in the string, converting an identified quantity word into digit form, and normalizing the string to produce a normalized string including only lowercase characters or digits; tokenizing the normalized string to produce tokens, the tokenizing of the normalized string including splitting the normalized string into a series of substrings using a sequence of delimiters, at leak one of the substrings including a lowercase character or digit; for each substring, performing an additional split on the substring by separating any digit from any other adjacent character, unless that character is another digit, and maintaining the internal character order of each split substring to produce a flattened list of tokenized tokens; based on a trained model, assigning a probability to at least one token as being indicative of a lot quantity; classifying the listing as a lot listing based on the assigned probability; and based on the classification, causing the display of the listing as a lot listing.

In some examples, identifying a string in the listing includes identifying the string in a title of the listing, and the sequence of delimiters includes white space delimiters. The classification system may further comprise a feature vector component for creating a feature vector for training the trained model, the feature vector component receiving as input a tokenized listing title including a position of a numerical token in a tokenized listing title and wherein, in relation to the position of the numerical token, the feature vector includes one or more of: a token after vector, a bigram after vector, a token before vector, a bigram before vector, a unit of measure vector, a token position ratio, and a token is divisible by k vector.

In some examples, the classification system further comprises a training component receiving as input the feature vector computed by the feature vector component, and wherein a training model per meta category is trained by the training component using a training set of listing titles for items which are listed under that meta category. In some examples, only a raw listing title string and an assigned lot size value are extracted from the listing title and are included as an entry in a training set for the trained model.

Figure 8:
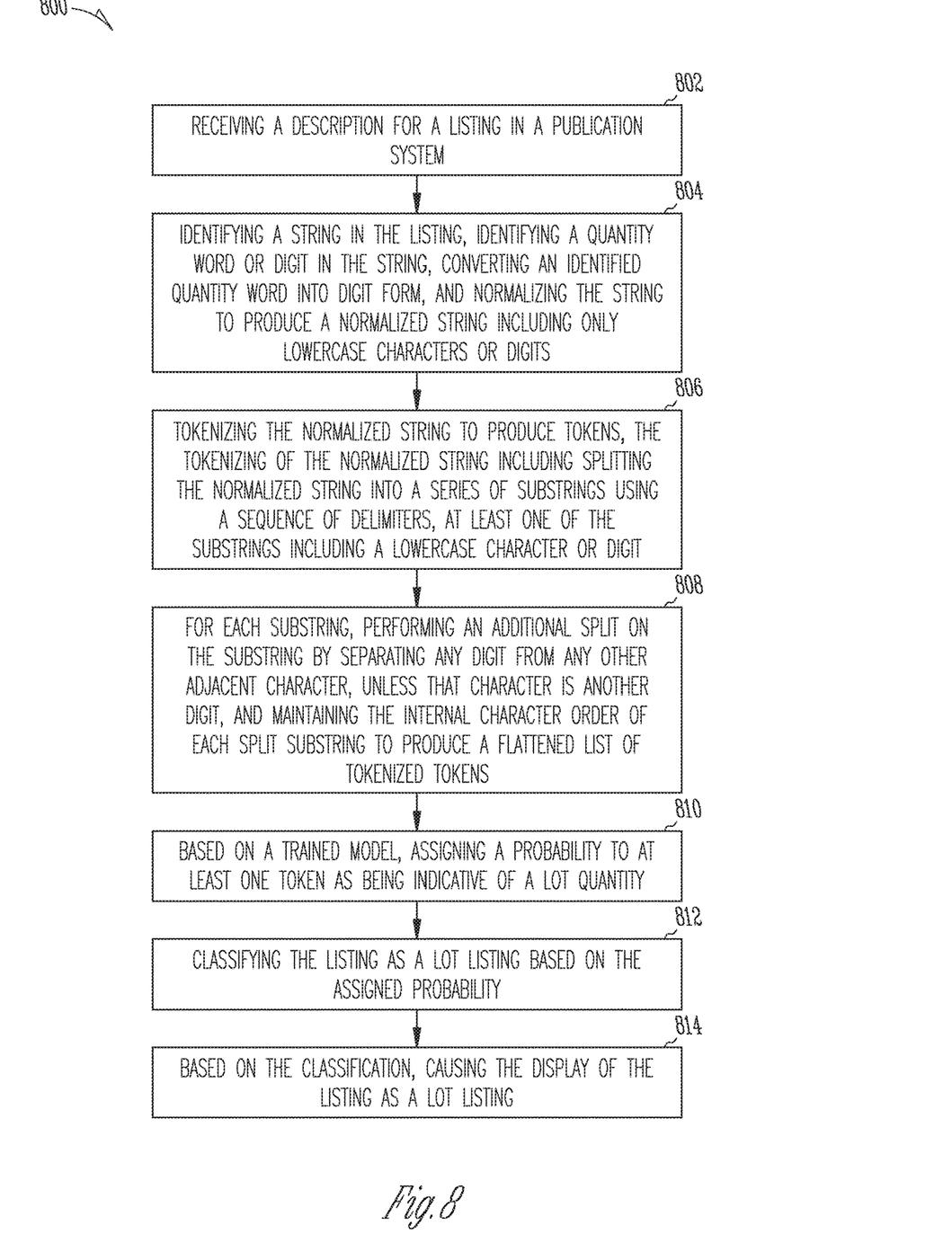
FIG. 8 is a flow chart of operations in a classification method, according to an example embodiment.

The present disclosure also includes example methods. In one example, and with reference to FIG. 8, a classification method 800 includes operations such as, at operation 802, receiving a description for a listing in a publication system; at operation 804, identifying a string in the listing, identifying a quantity word or digit in the string, converting an identified quantity word into digit form, and normalizing the string to produce a normalized string including only lowercase characters or digits; at operation 806, tokenizing the normalized string to produce tokens, the tokenizing of the normalized string including splitting the normalized string into a series of substrings using a sequence of delimiters, at least one of the substrings including a lowercase character or digit; at operation 808, for each substring, performing an additional split on the substring by separating any digit from any other adjacent character, unless that character is another digit, and maintaining the internal character order of each split substring to produce a flattened list of tokenized tokens; at operation 810, based on a trained model, assigning a probability to at least one token as being indicative of a lot quantity; at operation 812, classifying the listing as a lot listing based on the assigned probability; and, at operation 814, based on the classification, causing the display of the listing as a lot listing.

Identifying a string in the listing may include identifying the string in a title of the listing, and the sequence of delimiters may include white space delimiters.

The classification method may further comprise creating a feature vector for training the trained model by receiving a tokenized listing title including a position of a numerical token in a tokenized listing title, and wherein, in relation to the position of the numerical token, the feature vector includes one or more of: a token after vector, a bigram after vector, a token before vector, a bigram before vector, a unit of measure vector, a token position ratio, and a token is divisible by k vector.

In some examples, the classification method further comprises receiving the feature vector as input into a training component, and training a training model for a meta category using the training component and a training set of listing titles for items which are listed under that meta category.

In some examples, the classification method further comprises extracting only a raw listing title string and an assigned lot size value from the listing title and including them as an entry in a training set for the trained model.

Figure 9:
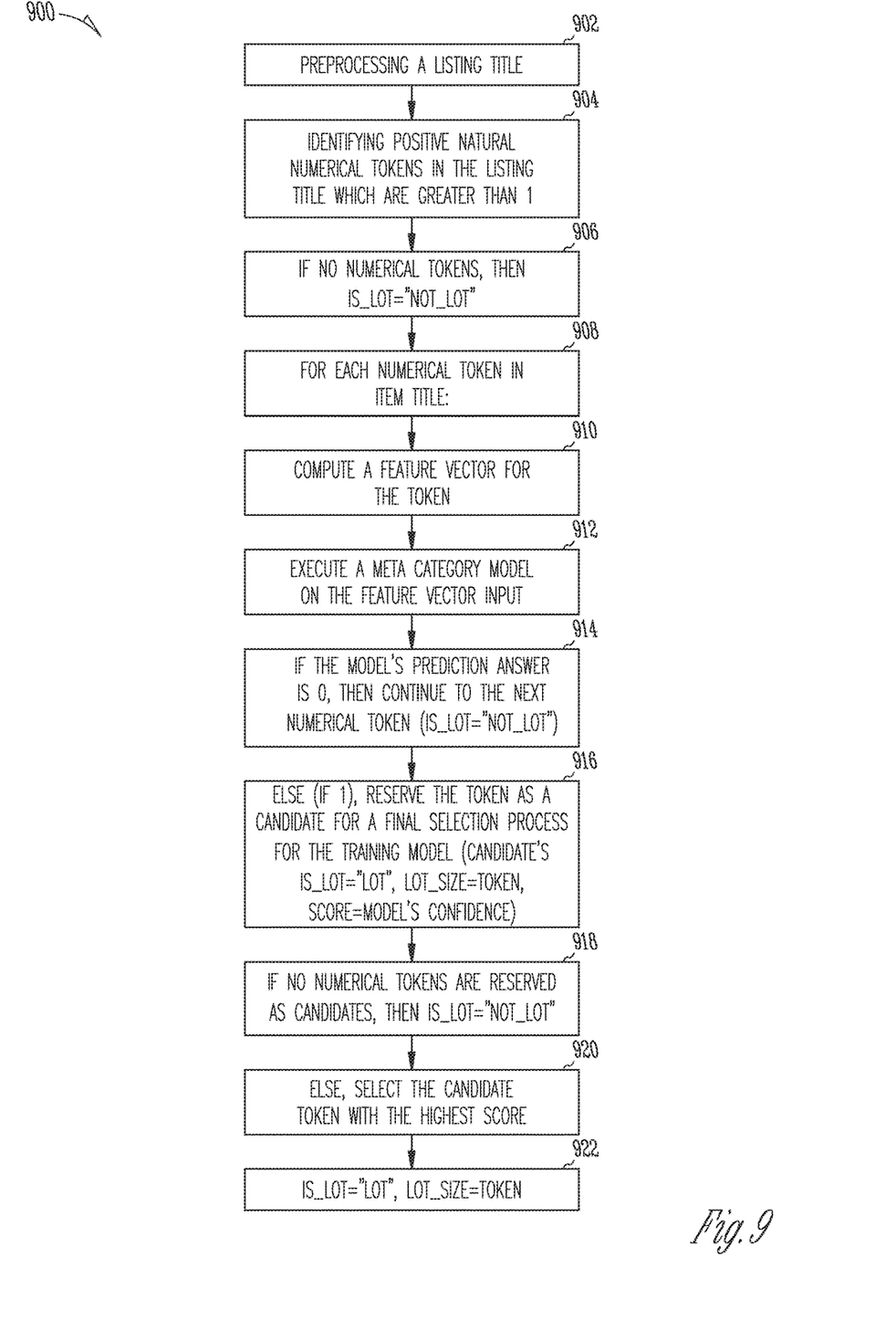
FIG. 9 is a flow chart depicting operations in a lot classification algorithm, in accordance with an example embodiment.

In another embodiment, with reference to FIG. 9, a lot classification algorithm 900 includes operations such as, at operation 902, preprocessing a listing title using one or more of the preprocessing methods described above; at operation 904, identifying positive natural numerical tokens in the listing title which are greater than 1; at operation 906, if there are no numerical tokens, then IS_LOT="NOT_LOT"; at operation 908, for each numerical token in item title: at operation 910, compute a feature vector for the token; at operation 912, execute a meta category model on the feature vector input; at operation 914, if the model's prediction answer is 0, then continue to the next numerical token (IS_LOT="NOT_LOT"); else (if 1), at operation 916, reserve the token as a candidate for a final selection process for the training model (candidate's IS_LOT="LOT", LOT_SIZE=token, SCORE=model's confidence). The operations 910-916 may be sub-operations of operation 908. At operation 918, if no numerical tokens are reserved as candidates, then IS_LOT="NOT_LOT"; else, at operation 920, select the candidate token with the highest SCORE. Finally, at operation 922, IS_LOT="LOT", LOT_SIZE=token.

In some examples, a non-transitory machine-readable medium includes instructions 410 that, when read by a machine 400, cause the machine 400 to perform operations comprising at least the non-limiting example operations summarized above.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A classification system comprising:
   at least one processor; and
   a memory storing instructions that, when executed by the at least one processor, cause the classification system to perform operations comprising, at least:
   receiving a description for a listing in a publication system;
   identifying a string in the listing;
   identifying a quantity word in the string;
   converting the identified quantity word into digit form;
   producing a normalized string including only lowercase characters and digits based at least in part on the converting;
   tokenizing the normalized string to produce tokens, the tokenizing of the normalized string including:
      splitting the normalized string into a series of substrings using a sequence of delimiters, a first substring of the series of substrings including a lowercase character and a digit;
      performing an additional split on the first substring by separating the digit from the lowercase character;
      maintaining an internal character order of each split substring; and
      producing a flattened list of tokenized tokens;
   based on a trained model, assigning a probability to at least one token as being indicative of a lot quantity;
   classifying the listing as a lot listing based on the assigned probability; and
   based on the classification, causing display of the listing as a lot listing.

2. The classification system of claim 1, wherein identifying the string in the listing includes identifying the string in a title of the listing.

3. The classification system of claim 1, wherein the sequence of delimiters includes white space delimiters.

4. The classification system of claim 1, further comprising a feature vector component for creating a feature vector for training the trained model, the feature vector component receiving as input a tokenized listing title including a position of a numerical token in a tokenized listing title and wherein, in relation to the position of the numerical token, the feature vector includes one or more of: a token after vector, a bigram after vector, a token before vector, a bigram before vector, a unit of measure vector, a token position ratio, and a token is divisible by k vector.

5. The classification system of claim 4, wherein the system further comprises a training component receiving as input the feature vector computed by the feature vector component, and wherein a training model per meta category is trained by the training component using a training set of listing titles for items which are listed under that meta category.

6. The classification system of claim 2, wherein only a raw listing title string and an assigned lot size value are extracted from the listing title and are included as an entry in a training set for the trained model.

7. A classification method at a classification system comprising one or more processors, comprising:
   receiving, at the one or more processors, a description for a listing in a publication system;
   identifying, at the one or more processors, a string in the listing;
   identifying, at the one or more processors, a quantity word in the string;
   converting, at the one or more processors, the identified quantity word into digit form;
   producing, at the one or more processors, a normalized string including only lowercase characters and digits based at least in part on the converting;

tokenizing, at the one or more processors, the normalized string to produce tokens, the tokenizing of the normalized string including;
splitting the normalized string into a series of substrings using a sequence of delimiters, a first substring of the series of substrings including a lowercase character and a digit;
performing an additional split on the first substring by separating the digit from the lowercase character;
maintaining an internal character order of each split sub string; and
producing a flattened list of tokenized tokens;
based on a trained model, assigning, at the one or more processors, a probability to at least one token as being indicative of a lot quantity;
classifying, at the one or more processors, the listing as a lot listing based on the assigned probability; and
based on the classification, causing, at the one or more processors, the display of the listing as a lot listing.

8. The classification method of claim 7, wherein identifying the string in the listing includes identifying the string in a title of the listing.

9. The classification method of claim 7, wherein the sequence of delimiters includes white space delimiters.

10. The classification method of claim 7, further comprising creating a feature vector for training the trained model by receiving a tokenized listing title including a position of a numerical token in a tokenized listing title and wherein, in relation to the position of the numerical token, the feature vector includes one or more of: a token after vector, a bigram after vector, a token before vector, a bigram before vector, a unit of measure vector, a token position ratio, and a token is divisible by k vector.

11. The classification method of claim 10, further comprising receiving the feature vector as input into a training component, and training a training model for a meta category using the training component and a training set of listing titles for items which are listed under that meta category.

12. The classification method of claim 8, further comprising extracting only a raw listing title string and an assigned lot size value from the listing title and including them as an entry in a training set for the trained model.

13. A non-transitory machine-readable medium containing instructions which, when read by a machine, cause the machine to perform operations comprising, at least:
receiving a description for a listing in a publication system;
identifying a string in the listing;
identifying a quantity word in the string;
converting the identified quantity word into digit form;
producing a normalized string including only lowercase characters and digits based at least in part on the converting;
tokenizing the normalized string to produce tokens, the tokenizing of the normalized string including;
splitting the normalized string into a series of substrings using a sequence of delimiters, a first substring of the series of substrings including a lowercase character and a digit;
performing an additional split on the first substring by separating the digit from the lowercase character;
maintaining an internal character order of each split substring; and
producing a flattened list of tokenized tokens;
based on a trained model, assigning a probability to at least one token as being indicative of a lot quantity;
classifying the listing as a lot listing based on the assigned probability; and
based on the classification, causing the display of the listing as a lot listing.

14. The medium of claim 13, wherein identifying the string in the listing includes identifying the string in a title of the listing.

15. The medium of claim 13, wherein the sequence of delimiters includes white space delimiters.

16. The medium of claim 13, wherein the operations further comprise creating a feature vector for training the trained model by receiving a tokenized listing title including a position of a numerical token in a tokenized listing title and wherein, in relation to the position of the numerical token, the feature vector includes one or more of: a token after vector, a bigram after vector, a token before vector, a bigram before vector, a unit of measure vector, a token position ratio, and a token is divisible by k vector.

17. The medium of claim 16, wherein the operations further comprise receiving the feature vector as input into a training component, and training a training model for a meta category using the training component and a training set of listing titles for items which are listed under that meta category.

18. The medium of claim 14, wherein the operations further comprise extracting only a raw listing title string and an assigned lot size value from the listing title and including them as an entry in a training set for the trained model.

* * * * *